Nov. 23, 1948.   J. C. CHRISTIAN   2,454,502
GUN SUPPORTING MECHANISM

Filed June 30, 1945   2 Sheets-Sheet 1

INVENTOR.
JOHN C. CHRISTIAN
BY Reynolds & Beach
ATTORNEYS.

Nov. 23, 1948.    J. C. CHRISTIAN    2,454,502
GUN SUPPORTING MECHANISM

Filed June 30, 1945    2 Sheets-Sheet 2

INVENTOR.
JOHN C. CHRISTIAN
BY Reynolds & Beach
ATTORNEYS.

Patented Nov. 23, 1948

2,454,502

UNITED STATES PATENT OFFICE 2,454,502

GUN SUPPORTING MECHANISM

John C. Christian, Seattle, Wash., assignor to Boeing Airplane Company, a corporation of Delaware Application June 30, 1945, Serial No. 602,533

6 Claims. (Cl. 89—37.5)

The gun mount of my invention affords elevational and traversing movement for a gun or guns carried by it, and is particularly adapted for a so-called chin turret installation, that is, a turret suspended immediately below the forward end of an airplane fuselage, although it is also suitable for comparable installations located elsewhere on an airplane or other vehicle.

My gun mount can be manufactured as a unit for application to an airplane or other vehicle, to be carried by simple structure provided in such vehicle. Preferably such gun mount supports a gun adapted to be sighted by a remote sight, and consequently it incorporates mechanism which can be connected to a movable sight, to cause such sight to follow movement of the gun.

An object of my invention was to simplify the construction of such a gun mount so that, while it is rugged, it is composed of comparatively few parts which form a relatively light structure, and one which can be fabricated economically.

A further object was to effect movement of the gun mount by compact and efficient drive mechanism which would be reliable in operation.

An important object is to support the gun mount from the vehicle structure so that, if it should become necessary to repair the gun mount, it could be removed quickly as a unit from the vehicle and replaced expeditiously by a like unit.

Other advantageous features of my invention will be pointed out in the following description of the preferred form of my gun mount illustrated in the drawings.

Figure 1:
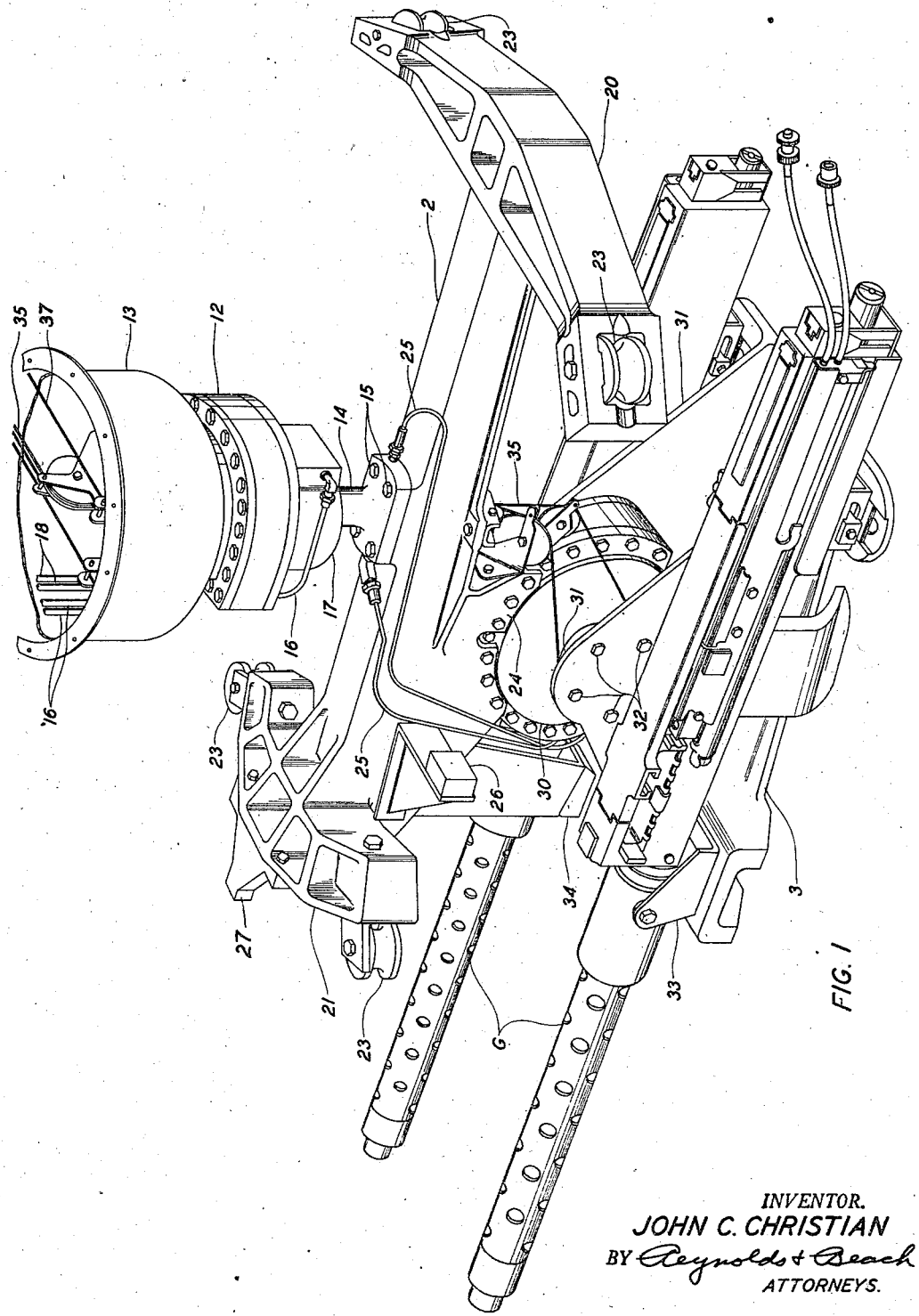
Figure 1 is a top perspective view of the gun mount apart from its supporting structure.
Figure 2:
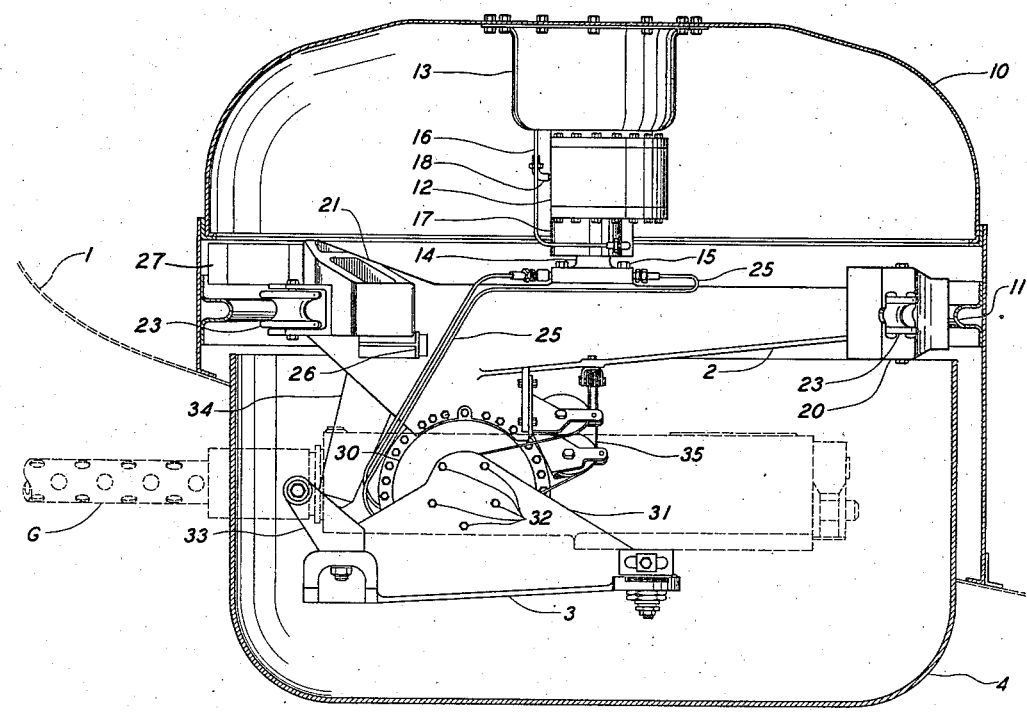
Figure 2 is a side elevational view of my gun mount installed in a chin turret structure shown in section.
Figure 3:
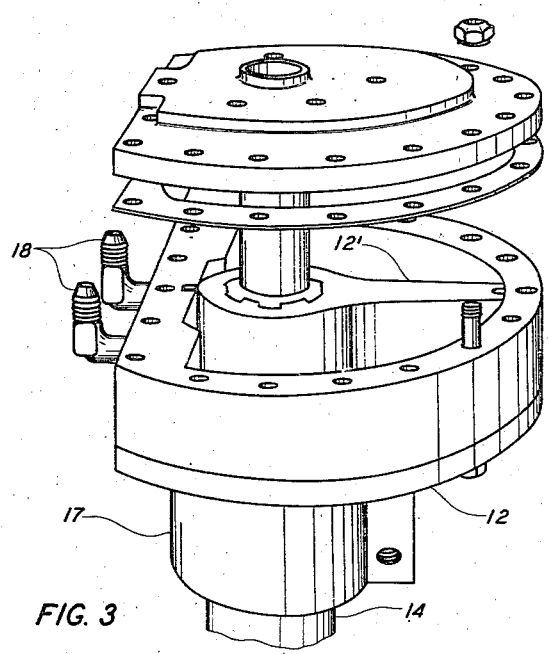
Figure 3 is a top perspective view of a drive motor for my gun mount showing parts in exploded relationship.

Since my gun mount was designed primarily for incorporation in a so-called chin turret installation of an airplane, it has been illustrated in such an application in Figure 2. Within the airplane skin 1 is mounted an upper housing or dome 10 which is stationary, forming a downwardly opening cavity in the under side of the fuselage. This housing is preferably sealed to the skin about its edge, and itself is air-tight, so that the space surrounding it within the airplane fuselage may be under air pressure greater than atmospheric, whereas the space within this housing will be under only atmospheric pressure. All apertures in the dome may be sealed to prevent leakage through it of air under pressure from the space within the fuselage.

Housing 10, fixed to the aircraft structure, carries an annular track 11, which may be of sheet metal formed as a channel. Such construction is rigid, although light. Preferably this track is secured rigidly to the housing dome 10 in a plane disposed transversely and generally centrally of the dome, which normally is substantially horizontal, and is intended to carry the entire weight of my gun mount and the gun or guns supported from it. Thus the track 11, being integral with dome 10, forms a permanent part of the aircraft structure.

The gun mount structure is all supported by a carriage composed of a beam 2 extending diametrically across the annular track 11, having generally arcuate transverse arms 20 and 21 secured centrally to the opposite ends of the beam and extending generally perpendicular to it. Opposite ends of these arms carry rollers 23 with peripheries grooved complemental to track 11 and engageable with it. When these rollers are engaged with the track they will withstand considerable stress acting in a direction perpendicular to the plane of the track, being quite capable of supporting the weight of the gun mount carried by beam 2.

If a gun is suspended from the carriage beam 2 it will be evident that it can be traversed about a normally vertical axis merely by shifting the carriage circumferentially around its track 11. In order to effect elevational movement of a gun thus supported, however, it is mounted in a frame 3 tiltable about an axis parallel to the plane of the track, and hence normally horizontal. For simplicity and lightness the mechanism for supporting this frame from beam 2 and for tilting it about its horizontal axis to elevate or to depress the gun may be combined. Preferably such mechanism is a hydraulic vane motor 30, the shaft of which is capable of turning through approximately 120 degrees at least, and may be rotatable through a greater angle.

The casing of vane motor 30 may be located immediately beneath the main supporting beam 2 and between parallel flanges 24 integral with and projecting downward from such beam. These flanges are spaced apart sufficiently to receive the vane motor between them and may be bolted or otherwise conveniently secured to its casing. The vane motor shaft will thus extend transversely of the beam 2 and parallel to the plane of track 11, defining the axis about which frame 3 may tilt to elevate or depress a gun carried by it.

Frame 3 preferably is supported at its center by parallel flanges 31 projecting upward from it and spaced apart to lie adjacent to opposite sides of the vane motor 30. The opposite ends of the vane motor shaft may be secured to such flanges, respectively, by bolts 32 or other suitable means. With the frame thus supported at its center it may accommodate twin machine guns G located in parallel relationship along opposite sides of the flanges 31. Suitable brackets 33 carried by the tilting frame adjacent to its flanges 31 hold the guns secured rigidly to the frame.

The flanges 24 of beam 2 and flanges 31 of frame 3 should project sufficiently far from their respective members to dispose the guns G well below the contour of the fuselage skin 1 encircling dome 10. Preferably the rotative axis of the shaft of vane motor 30 lies beyond the skin contour, and passes substantially midway between the upper and lower surfaces of the guns. The two flanges 31 are secured to the shaft of the vane motor in such relationship that, as the vane of the motor swings, the barrel of each machine gun G can point forward substantially parallel to the portion of the fuselage skin forward of the dome in the extreme upward position of swing of frame 3. Thus, when beam 2 is directed generally fore and aft, the guns can be elevated approximately 15 degrees above horizontal, and can be depressed approximately 105 degrees from horizontal position to fire well rearwardly of vertically downward.

While elevating and depressing movements of the guns G are effected by vane motor 30, drive mechanism is required to shift beam 2 angularly around the supporting track 11 to traverse the guns. This movement also may be under the control of a vane motor, such a motor 12 being mounted stationarily with respect to dome 10 by a hollow mounting shell 13 which is bolted rigidly to the under side of the dome. The shell and vane motor are located relative to the dome so that the axis of the vane motor shaft 14 is disposed perpendicular to the plane of track 11 and passes through the center of the track annulus. The vane motor shaft is secured, such as by bolts 15, to the center of beam 2.

As stated previously the casing of elevating vane motor 30 is mounted rigidly with respect to the supporting beam 2, but this beam is rotative relative to the dome 10. While it is a simple matter to connect hydraulic conduits 16, passing through shell 13, to the stationary casing of vane motor 12, the liquid supplied to conduits 25 connected directly to vane motor 30 must pass downward through the hollow shaft 14 of vane motor 12. This is accomplished by providing a swivel joint 17 of conventional type capable of conducting hydraulic liquid from the conduits 16 to the conduits 25 of the lower vane motor casing. Hydraulic liquid is supplied to the traversing vane motor 12 through conduits 18.

The manner in which the vane motors operate to aim the guns will now be evident. The conduits 16 and 18 are connected to suitable hydraulic liquid supply and control mechanism (not shown). When the controls are manipulated to traverse the gun, liquid under pressure will be supplied through conduits 18 to one side or the other of the vane 12' of motor 12 to rotate the beam 2 by shifting its rollers along track 11. If it is desired to elevate or to depress the guns, the controls will effect a supply of hydraulic liquid under pressure to the elevating vane motor 30 to drive it in the desired direction for tilting frame 3.

Since the guns G are intended to cover principally a forward field of fire, the shaft 14 of motor 12, like that of motor 30, may be capable of rotating through an angle of only about 100 degrees. If a greater range of movement is desired, the traversing drive means for beam 2 may be altered appropriately. In many instances, however, it may be desirable to limit traverse and elevation of the guns to an even smaller range. While the vane motors could be designed specially for each particular installation, so that their vanes could not travel beyond the desired location, it is more convenient to provide positive stops engageable by portions of the gun mount. Thus traversing movement is limited by engagement of the lug 27 on the carriage with suitable stops on the housing 10, whereas elevational movement of the frame 3 is limited by its engagement with stop 34, and its depressing movement is terminated by it striking stop 26.

Since an installation of the type described is located remote from the gunner's station, the sights usually provided on the guns cannot be employed for directing their fire. Instead a sight at the gunner's station may be provided which is moved automatically in coordination with the guns G. Traversing movement of the guns may be transmitted to the gun sight by cables 37, while elevational movement of the gun and frame 3 may be transmitted to the sight by cables 35, passing downward through the hollow shaft 14 of vane motor 12.

The frame 3 and associated mechanism, and the major portion of the guns G may be enclosed by a generally cylindrical housing 4 supported in any suitable manner from beam 2 and rotatable with it. Such housing has vertically extending slots through which the barrels of the guns project.

In order to remove all the working parts of the gun installation it is necessary merely to disengage rollers 23 from track 11, if necessary by first removing the rollers from beam 2, and then to disconnect the beam from its vane motor 12, or to separate the mounting shell 13 from dome 10. Alternatively the entire dome may be mounted for disengagement from the aircraft. In either type of installation the gun mechanism can be removed as a unit and replaced with a like unit.

I claim as my invention:

1. Gun supporting mechanism comprising a stationary housing having a substantially circular opening therein, a carriage received within said housing opening and including a beam extending substantially diametrically above said housing opening and having arms extending transversely of said beam at opposite ends thereof projecting beyond opposite sides of said beam, roller means interengaged between said arms and said housing and operable to support said carriage from said housing, a frame beneath and supported by said beam, adapted to carry a gun, and means operable to swing said frame relative to said carriage, and to rotate said carriage relative to said housing, for effecting aiming movement of the gun carried by said frame.

2. Gun supporting mechanism comprising a stationary housing having a substantially circular opening therein and an integral rib constituting an annular track circling the interior of the housing opening, a carriage including a beam extending substantially diametrically across said housing and having arms extending transversely of said beam at opposite ends thereof and projecting beyond opposite sides of said beam, rollers carried by the ends of said arms and guided and supported by said track, means reacting between said housing and said carriage and operable to move said carriage around said track, a frame beneath said beam, adapted to carry a gun, and means suspending said frame from said beam for movement therewith to traverse a gun carried by said frame, and including means reacting from said carriage to swing said frame relative thereto for elevating or depressing the gun carried by said frame.

3. Gun supporting mechanism comprising a stationary housing having a substantially circular opening therein, a carriage received within said housing opening and supported by said housing, and swingable about an axis perpendicular to and passing through the center of such housing opening, a vane motor having relatively movable vane and casing elements, one of said elements being suspended stationarily from said housing centrally of its opening and above said carriage, and the other of said elements being connected to said carriage, and operable to swing said carriage relative to said housing by relative movement of said elements, a frame beneath said carriage adapted to carry a gun, and means suspending said frame from said carriage for swinging therewith to traverse the gun carried by said frame, and including a vane motor having relatively movable vane and casing elements, one element of said latter vane motor being secured to said carriage and the other element of said latter vane motor being connected to said frame, and operable to swing said frame relative to said carriage, by relative movement of said latter vane motor elements, about an axis generally parallel to the plane of said housing opening for elevating or depressing the gun carried by said frame, and operating means for said second vane motor extending upward through said housing aperture and the central portion of said housing.

4. Gun supporting mechanism comprising a stationary housing having a substantially circular opening therein, a carriage received within said housing opening and supported by said housing, and swingable about an axis perpendicular to the center of such housing opening, a vane motor having its casing suspended stationarily above said carriage from the central portion of said housing and its vane connected to said carriage, and operable to swing said carriage relative to said housing by movement of said vane relative to said casing, a frame beneath said carriage adapted to carry a gun, and means suspending said frame from said carriage for swinging therewith to traverse the gun carried by said frame, and including a vane motor having its casing secured to said carriage substantially directly beneath said first vane motor, and having its vane connected to said frame and operable to swing said frame relative to said carriage, by movement of the vane of said latter vane motor relative to its casing, about an axis generally parallel to the plane of said casing opening for elevating or depressing the gun carried by said frame, and operating means for said second vane motor extending upward through said first vane motor and said housing.

5. Gun supporting mechanism comprising a stationary housing having a substantially circular opening therein, a carriage received within said housing opening and including a beam extending substantially diametrically across said housing opening and having arms extending transversely of said beam at opposite ends thereof projecting beyond opposite sides of said beam, roller means interengaged between said arms and said housing and operable to support the entire weight of said carriage from said housing, said beam being swingable about an axis perpendicular to said track and passing through the center of its annulus, a vane motor having relatively movable vane and casing elements, one of said elements being suspended stationarily from said housing centrally of its opening and above said carriage, and the other of said elements being connected to said beam, and operable to swing said carriage about an axis perpendicular to and passing through the center of said housing opening by relative movement of said elements, a frame beneath said beam, adapted to carry a gun, and means suspending said frame from said beam for swinging therewith to traverse a gun carried by said frame, and including a vane motor having relatively movable vane and casing elements, one element of said latter vane motor being secured to said beam and the other element of said latter vane motor being connected to said frame, and operable to swing said frame relative to said beam about an axis generally parallel to the plane of said housing opening for elevating or depressing a gun carried by said frame.

6. Gun supporting mechanism comprising a stationary housing having a substantially circular opening therein and an integral rib constituting an annular track circling the interior of said housing opening, a carriage including a beam extending substantially diametrically across said housing opening and having arms extending transversely of said beam at opposite ends thereof and projecting beyond opposite ends of said beam, rollers carried by the ends of said transverse arms, formed complemental to and engageable with said track and operable to support the entire weight of said carriage therefrom, said beam being swingable about an axis perpendicular to said housing opening and passing through the center thereof, a vane motor having its casing suspended stationarily from said housing and its vane connected to said beam, and operable to swing said carriage about an axis perpendicular to said track and passing through the center of its annulus by movement of said vane relative to said casing, a frame beneath said beam, adapted to carry a gun, and means suspending said frame from said beam for swinging therewith to traverse the gun carried by said frame, including a vane motor having its casing secured to said beam substantially directly beneath said first vane motor and its vane connected to said frame, and operable to swing said frame about an axis generally parallel to the plane of said track for elevating or depressing the gun carried by said frame, by movement of the vane of said second vane motor relative to its casing, and operating means for said second vane motor extending upward through said first vane motor and said housing.

JOHN C. CHRISTIAN.

REFERENCES CITED

The following references are of record in the file of this patent:

UNITED STATES PATENTS

| Number | Name | Date |
|---|---|---|
| 2,261,121 | Martin | Nov. 4, 1941 |
| 2,350,946 | Trotter et al. | June 6, 1944 |
| 2,390,013 | Trotter | Nov. 27, 1945 |
| 2,394,462 | Le Roy et al. | Feb. 5, 1946 |

FOREIGN PATENTS

| Number | Country | Date |
|---|---|---|
| 184,191 | Great Britain | Aug. 3, 1922 |
| 797,795 | France | Feb. 24, 1936 |